(12) United States Patent
McAloon et al.

(10) Patent No.: US 9,135,133 B2
(45) Date of Patent: Sep. 15, 2015

(54) METRIC OBJECT TRACKING SYSTEM

(75) Inventors: Daniel McAloon, Plano, TX (US);
Joshua Logan Reese, Lewisville, TX (US)

(73) Assignee: Softlayer Technologies, Inc., Dallas, TX (US)

( * ) Notice: Subject to any disclaimer, the term of this patent is extended or adjusted under 35 U.S.C. 154(b) by 1469 days.

(21) Appl. No.: 12/568,455

(22) Filed: Sep. 28, 2009

(65) Prior Publication Data

US 2011/0078227 A1    Mar. 31, 2011

(51) Int. Cl.
*G06F 15/16*    (2006.01)
*G06F 11/30*    (2006.01)
*G06F 11/34*    (2006.01)

(52) U.S. Cl.
CPC ........ *G06F 11/3006* (2013.01); *G06F 11/3093* (2013.01); *G06F 11/3409* (2013.01); *G06F 11/3466* (2013.01)

(58) Field of Classification Search
CPC ..... H04L 41/06; H04L 41/0213; H04L 41/22; G06F 11/3093; G06F 11/3409; G06F 11/3466
USPC ......................................................... 709/201
See application file for complete search history.

(56) References Cited

U.S. PATENT DOCUMENTS

| | | | |
|---|---|---|---|
| 6,321,338 B1 * | 11/2001 | Porras et al. ................... 726/25 |
| 7,219,239 B1 * | 5/2007 | Njemanze et al. ................ 726/3 |
| 7,685,126 B2 * | 3/2010 | Patel et al. ..................... 707/770 |
| 8,095,640 B2 * | 1/2012 | Guingo et al. ................. 709/224 |
| 8,296,412 B2 * | 10/2012 | Secor et al. .................... 709/224 |
| 2005/0114706 A1 * | 5/2005 | DeStefano et al. ........... 713/201 |
| 2005/0125807 A1 * | 6/2005 | Brady et al. ................... 719/318 |
| 2012/0265880 A1 * | 10/2012 | Warwick et al. .............. 709/225 |

OTHER PUBLICATIONS

Yang et al. "A Scalable, Web-Based Architecture for Hierarchical Network Management". Global Telecommunications Conference—Globecom'99. 1999. pp. 1882-1888.*

* cited by examiner

*Primary Examiner* — John MacIlwinen
(74) *Attorney, Agent, or Firm* — Schmeiser, Olsen & Watts, LLP (57) ABSTRACT

Various embodiments of a object metric tracking system are disclosed, applicable to distributed systems composed of a variety of computing nodes coupled together via a network. The computing nodes are arranged in various physical and virtual configurations via a configuration system. Detector nodes are also coupled to the distributed system, each node including one or more modules dedicated to collecting data about tracked system metrics. The data from the detector nodes is sent to a processing engine where it is decomposed for quick storage in a data storage pool including a number of independent storage nodes. A smart metric tracking object is used to provide programmatic access to the data in the storage pool, automatically abstracting away the details of the storage system. A reporter component processes the data and provides human or machine-readable reports for integration with various systems, including a reporting website.

14 Claims, 5 Drawing Sheets

METRIC OBJECT TRACKING SYSTEM

BACKGROUND

A distributed computing system is a group of processing units that work together to present a unified system to a user. Distributed computing systems are usually deployed to improve the speed and/or availability of computing services over that provided by a single processing unit alone. Alternatively, distributed computing systems can be used to achieve desired levels of speed and availability within cost constraints.

Distributed systems can be generally described in terms of how they are designed to take advantage of specialization, redundancy, isolation, and parallelism. Specialization takes advantage of the separation of tasks within a system. Tasks can be done faster with processing units dedicated and specialized for those tasks. Redundancy is the opposite side of specialization—it refers to having multiple comparable processing units available for work. If there is a problem with any particular processing unit, other units can be brought in to handle the requests which would have gone to the problem unit. The resulting reliability is generally referred to as "high availability"—and a distributed system designed to achieve this goal is a high availability system. Isolation is related to redundancy. Part of the reason distributed systems use redundancy to achieve high availability is because each processing unit can be isolated from the larger system. Finally, parallelism is a characteristic of the computing tasks done by distributed systems. Work that can be split up into many independent subtasks is described as highly parallel or parallelizable. It is possible to use the different processing units in a distributed system to work on different parts of the same overall task simultaneously, yielding an overall faster result.

The term "cloud computing" is frequently used to describe the trend toward using networked distributed systems such as the ones described above to perform computing tasks, with customers charged according to their specific use of bandwidth, disk space, CPU time, and other cloud resources. The companies providing these cloud computing architectures are sometimes called Internet Service Providers, Application Service Providers, or Cloud Computing Providers. As customers become more sophisticated, however, there is a need for instrumented distributed architectures that can provide real-time reports relative to various metrics across an entire distributed platform.

SUMMARY

Various embodiments of a object metric tracking system are disclosed, applicable to distributed systems composed of a variety of computing nodes coupled together via a network. The computing nodes are arranged in various physical and virtual configurations via a configuration system. Detector nodes are also coupled to the distributed system, each node including one or more modules dedicated to collecting data about tracked system metrics. The data from the detector nodes is sent to a processing engine where it is decomposed for quick storage in a data storage pool including a number of independent storage nodes. A smart metric tracking object is used to provide programmatic access to the data in the storage pool, automatically abstracting away the details of the storage system. A reporter component processes the data and provides human or machine-readable reports for integration with various systems, including a reporting website.

DETAILED DESCRIPTION

One embodiment includes a system and method for metric tracking in a distributed system using a smart tracking object. To better illustrate the advantages and features of the embodiments, a particular description of several embodiments will be provided with reference to the attached drawings. These drawings, and other embodiments described herein, only illustrate selected aspects of the embodiments and do not limit the scope thereof.

For the sake of simplicity, the various embodiments will be described using common terms, where applicable. However, the use of common terms does not imply common implementations between embodiments. For example, one embodiment may use the term "node" to refer to a single computing element within a distributed system. However, "node" is meant to encompass virtual machines, logical aggregations of nodes, such as a rack or virtual rack in a distributed system, and other service elements used to provide computation, storage, and communication facilities into and within the distributed system. Some items are illustrated as being in direct connection for the sake of simplicity. Despite the apparent direct connection, it is understood that such illustration does not preclude the existence of intermediate components not otherwise illustrated.

Further, despite reference to specific features illustrated in the example embodiments, it will nevertheless be understood that these features are not essential to all embodiments and no limitation of the scope thereof is thereby intended. Possible alterations, modifications, and applications of the principles described herein, such as would occur to one skilled in the art, have been omitted for clarity and brevity; nevertheless, it is understood that such alterations, modifications, and applications are contemplated. For example, one embodiment may show the tracking of metrics related to bandwidth; however, other metrics including disk space, internal bandwidth, ports used, mail accounts, users, virtual machine images, startup time, computing resources, memory, and IP address use are all contemplated. Furthermore, some items are shown in a simplified form, and inherently include components that are well known in the art.

Figure 1A:
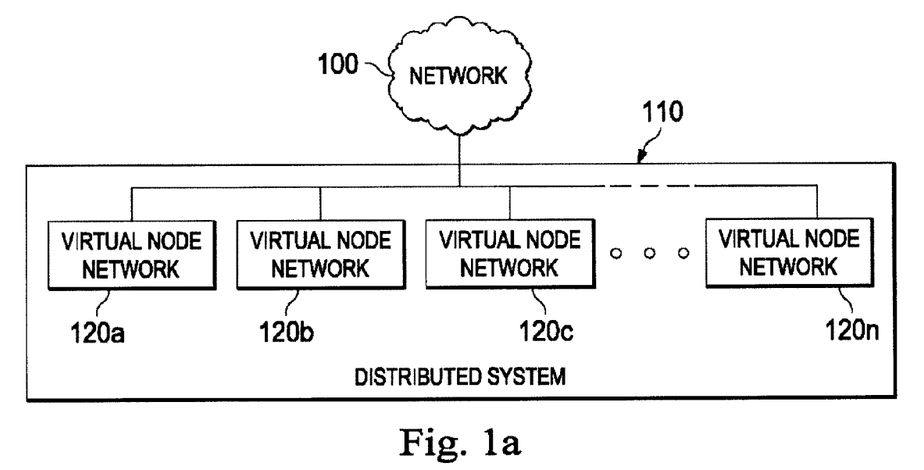
FIG. 1a is one view of a distributed system incorporating a metric object tracking system in accordance with one embodiment.
Figure 1B:
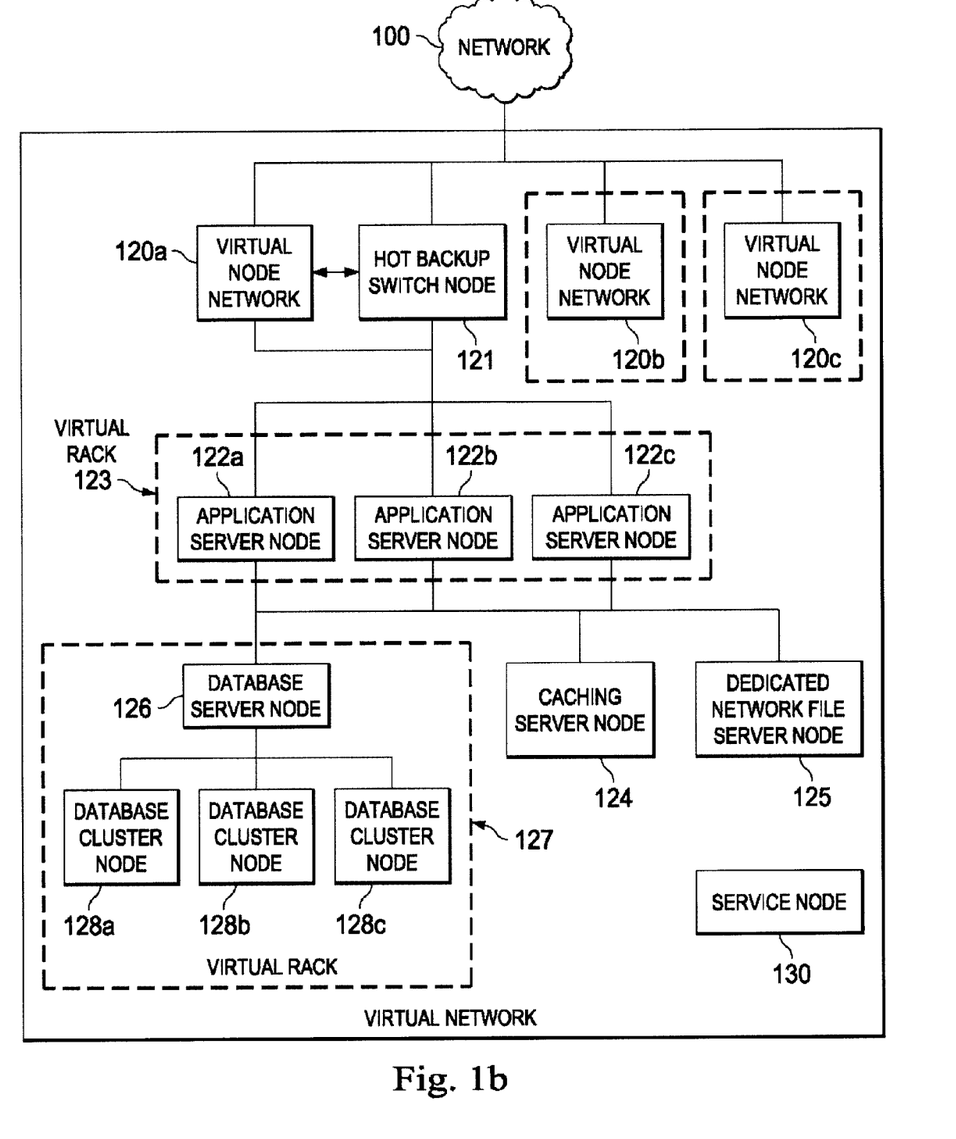
FIG. 1b is a second view of a distributed system incorporating a metric object tracking system in accordance with one embodiment.
Figure 1C:
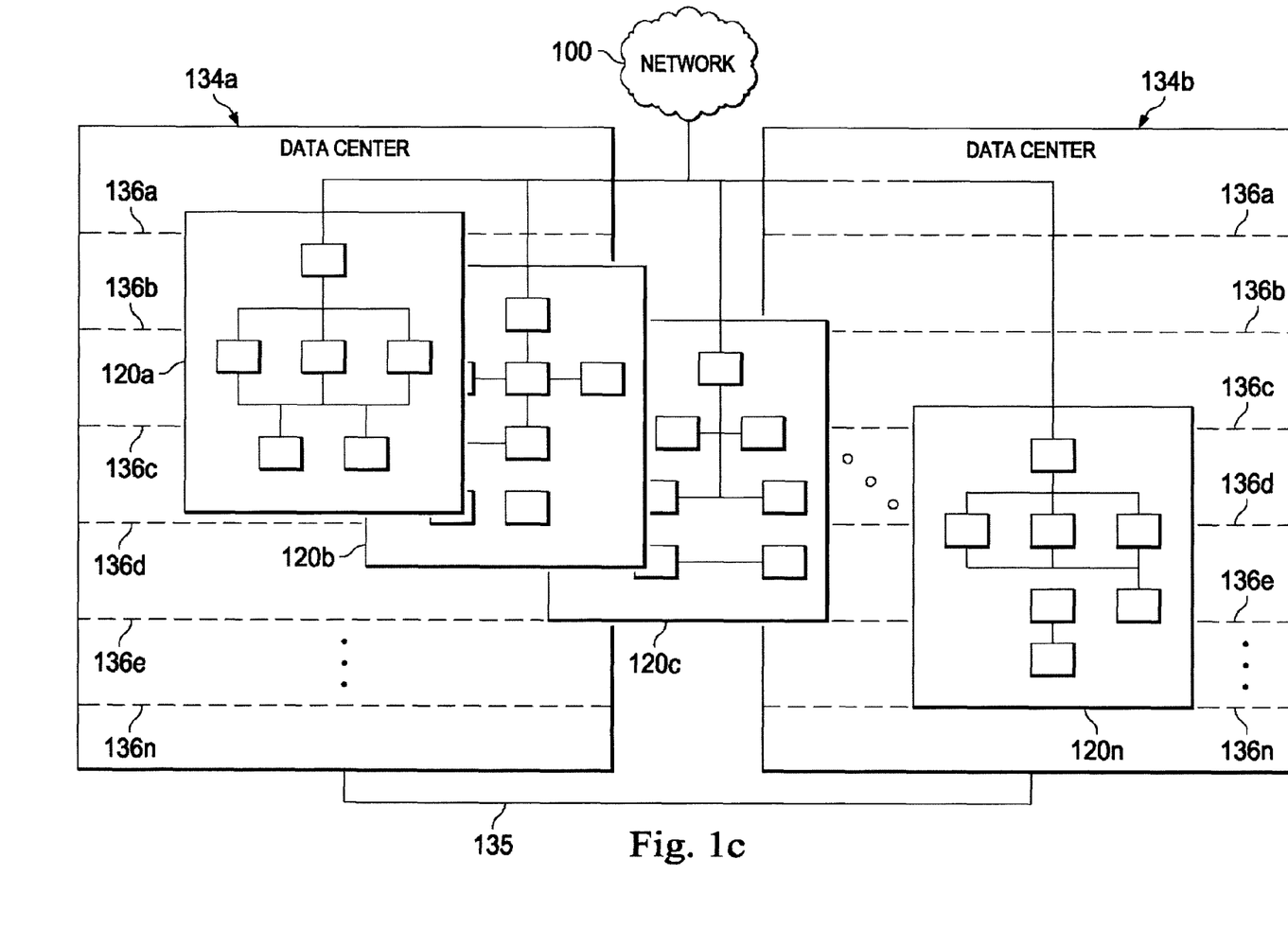
FIG. 1c is a third view of a distributed system incorporating a metric object tracking system in accordance with one embodiment.

FIGS. 1a-1c are diagrams showing different views of a distributed system to which an embodiment of the metric object tracking system could be applied. In all of FIGS. 1a-1c, requests come in from sites in the network cloud 100 to the distributed system 110. Within the distributed system, there are multiple nodes 120a, 120b, 120c ... 120n. As described further below, some of these nodes may be virtual and some may correspond to physical machines, depending on the context. Further, some nodes may only be visible to certain users. There is a configuration system by which different users with different permissions or levels of access can see different virtual or physical networks. Accordingly, there are a number of different perspectives a user may have on the distributed system 110, depending the way in which the system is being used, the capabilities of the user, and the portion of the system inspected.

A first typical view is shown in FIG. 1*a*. This view is for an external customer of the computing service. For example, this could be an end-user of a website. For external customers interacting with the distributed system, the system 110 may appear as one or many separate servers, each with a separate name and address. These are represented in FIG. 1*a* as the externally visible nodes 120*a*, 120*b*, and 120*c*. There is limited visibility into the internal structure of the system providing the computing service. Typical metrics associated with this view include external bandwidth, both incoming and outgoing, speed of response, and the distribution of requests along several different axes, such as port used, protocol used, and resource requested.

A second typical view is shown in FIG. 1*b*. This view is for an internal customer of the computing service. For example, this could be the external engineer renting cloud computing services from the distributed computing provider. In this example, it corresponds to the view seen by the external engineer managing the externally-visible node 1*a*. The external engineer can see and manage the networks of computing nodes specific to that customer, but the peer networks associated with 120*b* and 120*c* are invisible, except for their externally-visible services. As an example, one deployment may have the single externally visible node 120*a* acting as the incoming switch. There may be a second hot backup switch node at 121, with a heartbeat between the two nodes. The switch node 120*a* forwards requests arriving from outside the system to one of a number of application server nodes 122*a*-122*c*. These application servers may use a caching server node 124 or a dedicated network file server node 125. The application server nodes 122*a*-122*c* may also use a database server node 126, which itself is a single point of entry for a database cluster operating on nodes 128*a*-128*c*. The external engineer can also group nodes logically into virtual racks 123 (containing the application server nodes 122*a*-122*c*) and 127 (containing the database cluster nodes 126 and 128*a*-128*c*). The external engineer may also have access to a system statistics service node 130 that is only reachable from inside the distributed system. Typical metrics associated with this view include internal bandwidth, storage used, number of nodes used, types of nodes used, CPU time, responsiveness of various nodes, cache statistics, number of databases used, total system bandwidth, current costs, projected costs, memory use, burstable capacity, logical groups used and available, both incoming and outgoing, speed of response, and the distribution of requests along several different axes, such as port used, protocol used, and resources requested.

A third typical view is shown in FIG. 1*c*. This view is for an internal engineer at the distributed computing provider. The internal engineer can see the configuration variables visible to the external engineer. In addition, the internal engineer can see and manage the computing nodes and virtual racks across the multiple virtual networks that are only visible externally as 120*a*-120*c*. The computing nodes in the networks 120*a*-120*c* may be virtual machines, co-located physical machines, SANs, or other parts of the network. The computing resources available to each virtual network 120*a*-120*c* are managed across one or more pools of physical machines 134*a*-134*b*, including physical racks 136*a*-136*n* and various network interconnections 135. These physical computing pools are managed separately from the virtual networks that run on top of them, and may span multiple datacenters in different locations. This view may also include dedicated monitoring nodes or networks 132*a*-132*b*; these may be the same as the internal statistics node referred to in FIG. 1*b*, element 130. Typical metrics associated with this view include internal bandwidth per virtual network and per physical computing pool, physical storage used per network and per computing pool, numbers of virtual nodes and virtual networks, physical CPU utilization, virtual resource migration, permissions structures, network packet flow, physical rack utilization, physical server uptime and health, temperature, and internal cost. Other metrics measure payments, servers, rack slots, network ports, processors, hard drives, RAM sticks, and operating system usage. Further metrics measure firewall and VPN use, internal API use, and user history.

Real time (or near-real time) processing and reporting all of the metrics associated with the different views on the distributed computing system can leads to enormous amounts of data. For example, one embodiment of the system has more than 20,000 servers. Each of those servers is on 2 networks, the public network open to the Internet, corresponding to the external view shown in FIG. 1*a*, and a private network that only our customers can use, corresponding to the external engineer view shown in FIG. 1*b*. Each of those networks exists on a 3 to 4-level network hierarchy corresponding to the internal engineer view shown in FIG. 1*c*.

An illustrative use of one embodiment of the metric object tracking system is the reporting of bandwidth data per port. Even relatively small deployments result in more than 50,000 physical switch ports, but the number 50,000 is used below for simplicity of illustration. Each switch port has bandwidth in and bandwidth out, as well as packets in and packets out, resulting in 200,000 data points to poll. Polling the bandwidth used every 5 minutes results in 57,600,000 discrete data points per day, or 1,728,000,000 per month. The bandwidth data points are all 64 bit numbers, and are all associated with a 32 bit server ID, a 32 bit network ID, and a 32 bit date/time stamp. Excluding overhead from storage engines, a month's worth of raw data is 34.56 GB. Each physical port is associated with a physical rack, at least two virtual networks, and possible private logical racks, which adds another 50% to the data on average. Redundant storage of the data can double or triple that amount. That results at least 90 GB per month of data, with data storage from this single metric possibly reaching twice that as the network becomes more complex over time or as additional redundant copies of the data are maintained.

Further complicating the system is the nature of the stored data. The 90 GB of data associated with this single metric is not in a smaller number of large files, but is instead composed of more than five billion individual data records. Many types of key-value hashes or indexing schemes break down when the key is the same size as (or larger than) the value referenced by the key. For example, indexes frequently keep the key in memory for quick lookup. For the number of records associated with a single metric, the space necessary for the key (12 bytes) multiplied by the number of keys in a table can exhaust reasonable memory limits, even across a clustered system. Attempting to mitigate the memory pressure by splitting the index into many sub-indexes can run into limits on the number of files per directory, per disk, or per storage scheme.

Figure 2:
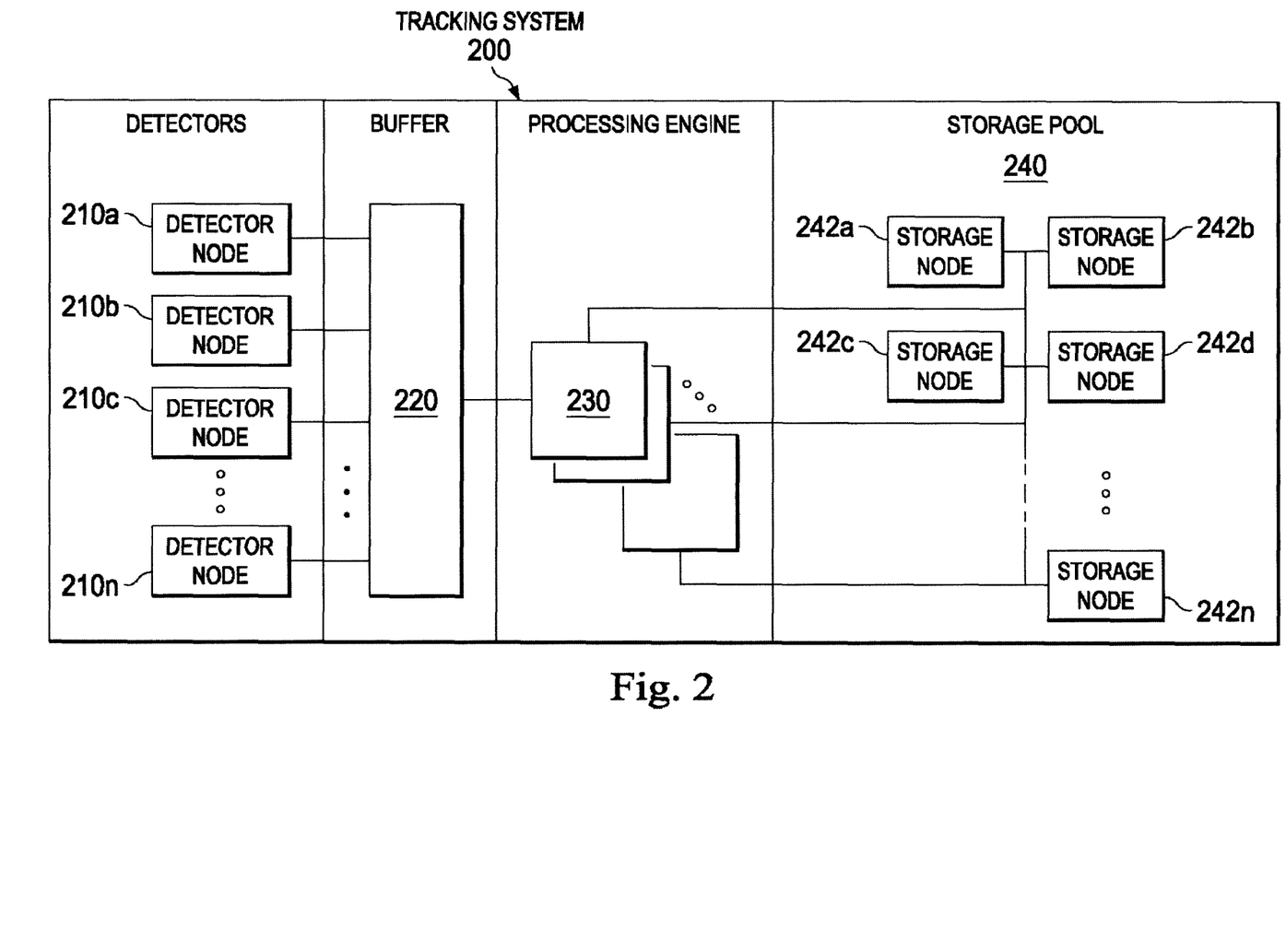
FIG. 2 is a block diagram of a metric object tracking system in accordance with one embodiment.

FIG. 2 is a block diagram of one embodiment of a metric object tracking system. The tracking system 200 can be separated into a number of different functional "modules" which perform the functions associated with various nodes. The nodes or modules as described herein may be specialized hardware. They can also be formed of general purpose computing hardware specialized by the use of a particular hardware or software process to perform a specific function. As described in more detail below, many of the nodes and modules have dedicated functions such as memory management, program flow, instruction processing, object storage, etc., and aspects of their respective implementations are known in the art.

For example, in one embodiment there are modules implemented as a hardware circuit comprising custom VLSI circuits or gate arrays, off-the-shelf logic chips, transistors, and other discrete components. Modules may also be implemented in programmable hardware devices such as field programmable gate arrays, programmable array logic boards or similar devices.

In another embodiment, one or more of the modules are implemented in software for execution by one or more processors, including various types of processors, via one or more memories. An identified module of executable program code may, for instance, comprise one or more physical or logical blocks of computer program instructions that may, for instance, be organized as an object, procedure, or function. These blocks of computer instructions are stored on one or more computer-readable storage devices accessible to the one or more processors. A computer program product comprises the one or more computer-readable storage devices. The term "computer-readable storage device" does not mean signal propagation media such as copper transmission cables, optical transmission fibers and wireless transmission media. A processor reads the instructions from the one or more computer-readable storage devices and executes a specific series of instructions, performing in software or firmware a process functionally identical to that which takes place in hardware embodiments of the invention.

Another embodiment uses higher-level components as modules. For example, a module may comprise an entire computer, or group of computers, acting together. A module may also comprise an off-the-shelf or custom program, such as a database management system. These higher-level modules may be decomposable into smaller hardware or software modules corresponding to different parts of a software program and identifiable chips (such as memory chips, ASICs, or a CPU) within a computer.

In one embodiment, the data enters the system through a series of detector nodes 210a-210c. These detector nodes may be implemented in different ways depending upon the specific metric being tracked. The gathered information can either be sent on immediately, for real-time traffic tapping and analysis, or it can be integrated over time. In embodiments where the information is sent on immediately, one preferred implementation uses a message service, such as those defined using AMPQ or JMS. In an embodiment where a tracked metric is integrated over time, a preferred implementation stores the tracked information or a suitable aggregate measure on a computer-readable medium. On a periodic basis, a poller module reads the value from the computer-readable medium and sends it to the other parts of the system.

For each tracked metric, appropriate detectors are known in the art. For example, a network bandwidth detector module could be an instrumented router or switch, including a virtual router or switch contained in a virtual network. The instrumented router could measure the packets passing through all connected network ports. Another embodiment tracking intrusion attempts includes a log analysis module that reads in audit or log files and perform instantaneous analysis on them. A different intrusion detection module monitors the packets on a network, such as an Ethernet network, by using a network card in promiscuous mode and silently reading all packets that pass through. Detector nodes can include recognizer modules that separate useful information from miscellaneous noise and send only the valuable information on to the next part of the system.

Tracking the physical condition of equipment is also managed using detectors. For example, location and inventory are tracked through modules composed of RFID tags and readers. Physical condition is tracked via various modules, such as temperature sensors, vibration gauges, or SMART sensors attached to the various computing nodes. If the temperature gets too high or if there is excessive vibration, the module sends a message further on for aggregation and reporting by the system.

Continuing with FIG. 2, some embodiments of the metric object tracking system include a buffer 220. The buffer 220 is used to aggregate measurement data and messages from many separate detector nodes. Alternatively, the buffer 220 is used to smooth out a bursty flow of data for easier manipulation later.

The metric object tracking system also includes a processing engine 230 and a data storage pool 240 including one or more high-volume write-optimized storage nodes 242a-242n. The buffers 220 and/or detector nodes 210 feed the processing engine 230, and the processing engine 230 feeds the storage nodes 242a-242n. The processing engine 230 may itself involve more than one node and either the processing engine 230 or one or more of the storage nodes 242a-242n may include a dedicated hardware processors to handle the volume of writes to the storage nodes 242a-242n.

To handle the volume of writes to the storage nodes 242a-242n, the processing engine 230 decomposes the data into a storable form. In some cases, decomposition of the metric data involves aggregation functions being used on the incoming data stream. In other cases, comparisons are performed between the metrics coming from several sources to cross-check results or remove redundant data. For example, the packets sent from one switch port on the internal network should equal the number of packets received by the designated receiving port after allowing for reasonable collision and retransmission overhead. If the two counts match, then referring to the same raw data stream using two different labels can cut the total amount of data stored. If there is a discrepancy between the two counts, that itself is a metric that can be tracked. In other cases, the function of the processing engine 230 is to label and tag the data so that it can be sent through to an appropriate storage node without any further delay. By separating out the processing engine from the storage nodes, the data manipulation and processing can be handled by the compute-intensive processing engine nodes and the time-intensive writes can be parallelized across a large number of independent storage nodes, resulting in high throughput.

In some embodiments, the storage nodes 242a-242n are organized as relational databases. For low volume writes, an off-the-shelf clustered database solution may be sufficient. For sufficiently high-volume writes, it is advantageous to keep each relational storage node independent from the others so as to encourage better horizontal scaling. To accommodate the relational storage nodes, the processing engine may perform denormalization of the data so that multiple relational database systems can be used in parallel without any joins between tables or other connections between independent storage nodes. For example, and as discussed in detail relative to FIG. 3 below, one deployed embodiment of the system aggregates the data such that part of the information that would typically be stored in a separate table is embedded within the table name. Each table in essence embodies a sub-select that could be expressed across the same data in fully normalized form. Splitting the information in this manner allows efficient sharding of the data set across ten independent storage nodes that are each completely independent of the others. It also keeps down the total number of tables as well as the size of each table. Further horizontal scaling is possible just by adding new storage nodes.

An alternative embodiment uses a tree-structured storage engine such as a directory. If a tree-structured storage engine is used, then different types of data can be stored in different branches of the tree, with different branches stored in separate nodes. The root of the tree acts as a director to send reads and writes to the proper subsidiary storage nodes by keeping a mapping of branches to physical or logical hosts. This alternative tree-structured storage allows a single virtual storage image without the imposed costs of a relational storage engine, but it requires a different recovery structure to handle the hierarchical data storage model.

Figure 3:
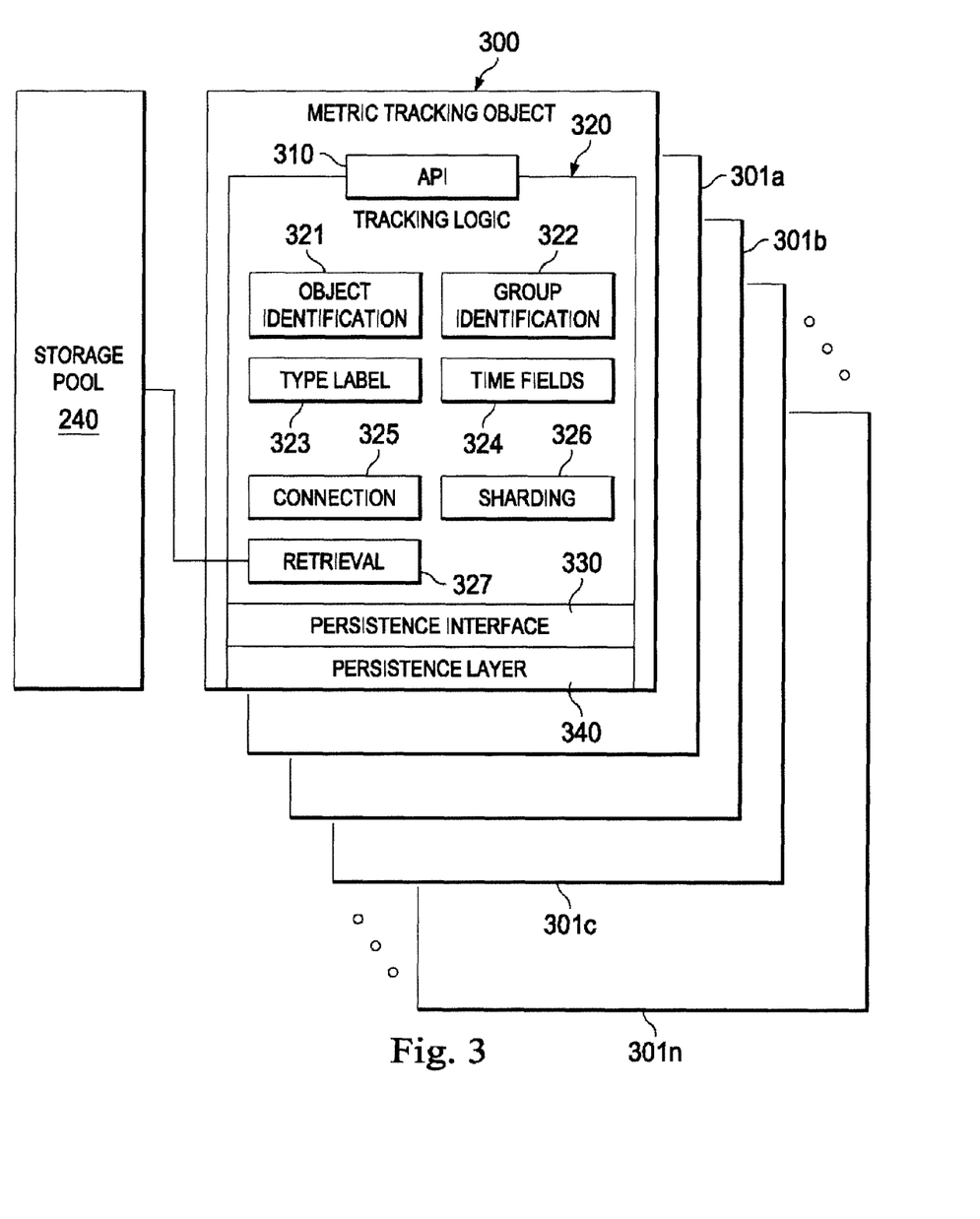
FIG. 3 is a block diagram of a metric tracking object in accordance with one embodiment.

FIG. 3 shows an embodiment of the metric object retrieval system. One side effect of the volume of writes to the data storage pool 240 discussed earlier is that the data may be initially stored in a relatively unprocessed form. Further, the individual pieces of data are spread across a number of independent storage nodes. This allows for horizontal scaling of the storage system, but it can make the retrieval and manipulation of the data values more burdensome. It is frequently useful to address the distributed storage system as a single entity, encapsulating the distributed system behind a single coherent interface.

This single coherent interface is the metric tracking object 300. It is used to allow easy manipulation of the data residing on the data storage pool 240, without specific knowledge of where the data is located on the storage nodes. The metric tracking object 300 calculates and maintains a record of the location of wanted data in the data storage pool 240, without necessarily exposing that information to the end-user of the system. Instead, the metric tracking object 300 encapsulates the complexity of the storage system by providing an opaque interface only. Requests from users into the storage system are proxied over to the storage tier; data from the storage tier is proxied back to the user.

In one embodiment, the metric tracking object 300 uses an object-oriented structure to provide a common interface to various data metrics that can be tracked over time. Inheritance and adaptation are used to provide custom metric tracking objects 301a-301c that provide additional support for specific kinds of data.

Internally, the metric tracking object 300 can be separated into an interface, including an exposed API 310, tracking logic 320, a persistence interface 330, and a persistence layer 340. One embodiment of the persistence interface is an object-relational mapper that marshals data to and from an underlying relational storage engine that backs the persistence layer 340. Note that the persistence layer used for the tracking object is not necessarily the same as the mechanism used to store the data in the data storage pool 240. In one deployed embodiment, there is a separate relational database that is used to persist the data associated with the smart tracking object, and a completely separate storage engine used for the data storage pool 240.

The API 310 is the opaque interface provided to users of the system. The interface is designed to be relatively simple, accepting requests for certain metric types from certain users for specific periods of time. In return, the requested data is provided. In this way, programmatic access to the metric data through the API abstracts all of the underlying complexity away from users of the system. For example, one embodiment includes a function getBandwithData( ). Other embodiments includes single points of entry for other types metrics, such as getTemperature( ) getCPUData( ) etc. Further embodiments include functions to store information back to the data storage pool 240, such as addData( ).

The metric tracking object 300 also includes tracking logic 320. The tracking logic 320 uses the information provided by users of the API, stored information retrieved through the persistence interface 330, and logical processes to calculate the location of various pieces of metric data in the data storage pool 240.

In one embodiment the tracking logic 320 includes a tracking object ID 321. The tracking object ID 321 is used to unambiguously refer to a specific tracking object and the information that it manages. In some embodiments, metric tracking objects referring to the same data can be shared between different users.

The tracking logic 320 also includes tracking group ID 322. The tracking group ID 322 allows otherwise-equivalent tracking objects to be associated with specific tracked metrics. For example, one tracking group ID 322 may be associated with a particular port, or a particular virtual rack, or other physical or logical element.

The tracking logic 320 also includes a type label 323. The type label 323 associates the tracking object with the type of data tracked by a particular instantiation of the object. This allows otherwise-equivalent tracking objects to be associated with different metrics relative to a common physical or logical structure. For example, one type label 323 may specify that the object tracks packets sent received by a particular port, whereas another type label 323 specifies that the object tracks packets received by the same port.

The tracking logic 320 also includes time fields 324. The time fields 324 may include specific dates or date-time ranges. The values associated with the time fields 324 may be retrieved through the persistence interface 330 or may be provided by users of the API 310.

The tracking logic 320 also includes connection functions 325. The specific implementation of these functions is implementation-dependent and depends upon the way the raw metric information is stored in the storage nodes 240. For example, one embodiment that uses a relational database on the storage nodes 242a-242n includes a sharding function 326. The sharding function 326 uses logical elements to determine which node in the data storage pool 240 to contact for a particular piece of data. In some embodiments, the sharding function 326 uses a mod operation on a numeric value to find the appropriate database. Another embodiment uses a hash function on some piece of data, such as md5 or SHA, that is guaranteed to provide a random distribution of output values given a non-random input. The sharding function 326 can also be used to determine what part of the storage on a specific node to address. For example, a third embodiment uses information about the query to address particular hosts and particular tables. For example, one embodiment finds the table name by concatenating the type label 323, the group ID 322, and the year and month taken from the time fields 324.

The connection functions 325 also include a storage node retrieval function 327. In some embodiments, the storage node retrieval function 327 can be an abstract interface provided by a subsidiary object-relational mapper, different from the object relational-mapper used in the persistence layer 330. The storage node retrieval function 327 retrieves or creates a connection to an appropriate storage node in the data storage pool 240, retrieves requested information, and returns it. The storage node retrieval function 327 knows which node to connect to, and which information to address on each node from the sharding function 326.

The metric tracking object 300 also includes a persistence interface 330 and a persistence layer 340. Those of skill in the art will recognize that the metric tracking object acts as a kind of smart index into the data storage pool 240. The amount of data in the storage pool 240 is large enough that directly indexing that information would exhaust the reasonably available memory. Accordingly, the metric tracking object uses a second persistence layer for its own information, separate from the data storage pool 240, and uses that information to calculate the appropriate index into the data storage pool 240. In one embodiment, the persistance layer 340 is a relational database and the persistence interface 330 is an object-relational mapper providing an object-oriented interface over the SQL result sets.

One advantage provided by some embodiments of the metric object tracking system is that it provides an easy point of entry for developers into the metric tracking system. In one embodiment, other systems at the distributed computing provider retrieve information using metric tracking objects 300. The metric tracking objects link particular objects in existing databases to that object's various data points in the data storage pool 240. Using an ORM as the persistence interface 330 and factory patterns as part of the connection functions 325, the metric tracking objects are sufficiently general that any value in the database can have an associated "trackingObject" member variable. Nodes designated as servers, virtual racks, cloud computing instances, and other systems simply call the API functions 310 on their tracking object, and the metric object tracking system automatically selects the correct database, selects the correct table, and pulls the correct fields, formatting them as a collection of generic result objects.

The API functions 310 provided by the metric tracking objects are also used to add data to the data storage pool 240. API users can pass an array of raw data objects to the addData( ) function, which automatically determines database node, write table, and data structure. The process of adding new tracked objects to the metric object tracking system is completely transparent to other API users. New tracking objects, data metrics, or computing nodes can be created and incorporated without changing existing systems.

In one embodiment, the reporting process imposes an additional constraint on the system. The system supports real-time reporting of the metric data, such as via a client application or a demand-generated web page. Real-time reporting requires a fast response rate and high data throughput so that incoming metrics are processed and displayed on demand. Further, some of the data may require preprocessing and correlation across various axes to present the necessary information to the user.

Figure 4:
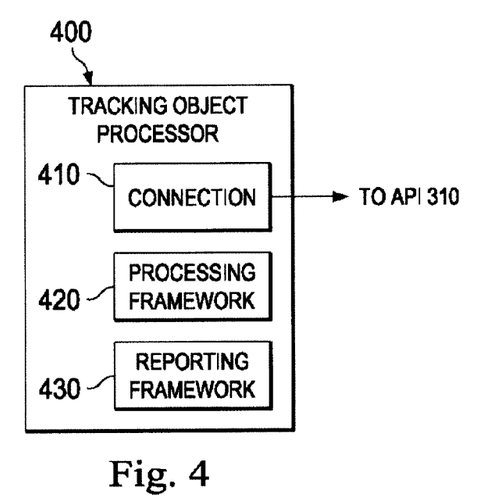
FIG. 4 is a block diagram of a metric tracking object processor in accordance with one embodiment.

FIG. 4 is a block diagram showing one embodiment of a metric tracking object processor 400 used to retrieve or manipulate the data to provided a specific metric for reporting purposes. The metric object tracking processor has a connection module 410. The connection module 410 is associated with the metric tracking object API 310 as described relative to FIG. 3. Using the metric object tracking API 310, the connection module 410 can ask for previously stored results, process them, and save them back into the high-volume data storage pool 240.

The metric tracking object processor 400 also includes a processing framework 420. The processing framework 420 is used to do time-intensive correlation of various metrics so that results can be precomputed as much as possible. The data retrieved via the connection module is tabulated along various dimensions and processed in a non-real-time manner. In one embodiment, the processing framework 420 uses parallel processing methods such as a mapreduce framework to collate many associated pieces of data into meaningful statistics. Due to the way in which mapreduce problems are split up for processing and then "reduced" into meaningful results, ongoing computation can keep track of and quickly digest real-time metric data feeds. These new results can then be reduced with previously computed and stored results to provide real-time processed statistics across multiple dimensions. Those skilled in the art will recognize that the processing framework may itself use a distributed processing system to quickly handle the computations on the raw metric data.

The metric tracking object processor 400 also includes a reporting framework 430. The reporting framework 430 uses raw and processed data to provide graphs, charts, reports, comma-separated files, and other useful reports. In one embodiment, the reporting framework 430 is used to provide real-time graphs of network bandwidth use.

It is understood that several modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

What is claimed is:

1. A method for tracking data in a distributed system, the method comprising:
   receiving, by one or more processors, a request from a user for data of a type of data gathered over a specified period of time, the request specifying the type of data and the period of time;
   identifying, by the one or more processors, a software object specific to the specified type of data and the specified period of time, wherein the software object includes first data, and wherein the first data comprises a label that identifies the type of data, a group identifier that identifies a group of software objects that include the identified software object, and time data that identifies the period of time;
   calculating, by the software object using the one or more processors the first data, a location in a storage pool, wherein the calculating the location in the storage pool comprises calculating a name of a table at the location in the storage pool, wherein the table includes the requested data, and wherein the calculating the name of the table comprises concatenating the label, the group identifier, and the time data;
   connecting, by the software object to the storage pool, to retrieve the requested data from the calculated location in the storage pool; and
   returning, by the software object to the user, the retrieved requested data.

2. The method of claim 1, wherein the identifying the software object comprises matching the type of data and the specified period of time specified by the user to data in the software object identifying the type of data and the period of time to which the software object is specific, respectively.

3. The method of claim 1, wherein the storage pool is a relational database comprising tables and data, and wherein the method further comprises:
   denormalizing the data in the storage pool to prevent joins between the tables in the storage pool.

4. The method of claim 1, wherein the calculating the location in the storage pool comprises performing a mod operation on a numeric value to find in the storage pool a location of a database comprising the requested data, and wherein the database comprises the table.

5. The method of claim 1, wherein the type of data requested is a distribution of requests for resources with respect to ports used, protocols used, and resources requested.

6. The method of claim 1, wherein the type of data requested is a number are nonzero differences between a total number of packets sent from a sending port to a designated receiving port and a total number of packets received by the receiving port from the sending port after allowing for collision and retransmission overhead.

7. A computer program product for tracking data in a distributed system, the computer program product comprising:
one or more computer-readable storage devices and program instructions stored on at least one of the one or more storage devices, wherein the program instructions comprise:
program instructions to receive a request from a user for data of a type of data gathered over a specified period of time, the request specifying the type of data and the period of time;
program instructions to identify a software object specific to the specified type of data and the specified period of time, wherein the software object includes first data, and wherein the first data comprises a label that identifies the type of data, a group identifier that identifies a group of software objects that include the identified software object, and time data that identifies the period of time;
program instructions to calculate, by the software object based on the received first data, a location in a storage pool, wherein to calculate the location in the storage pool comprises to calculate a name of a table at the location in the storage pool, wherein the table includes the requested data, and wherein to calculate the name of the table comprises to concatenate the label, the group identifier, and the time data;
program instructions to connect, by the software object to the storage pool, to retrieve the requested data from the calculated location in the storage pool; and
program instructions to return, by the software object to the user, the retrieved requested data, wherein the calculating the location in the storage pool comprises calculating a name of a table at the location in the storage pool.

8. The computer program product of claim 7, wherein the program instructions to identify the software object comprises program instructions to match the type of data and the specified period of time specified by the user to data in the software object identifying the type of data and the period of time to which the software object is specific, respectively.

9. The computer program product of claim 7, wherein the storage pool is a relational database comprising tables and data, and wherein the method further comprises:
program instructions to denormalize the data in the storage pool to prevent joins between the tables in the storage pool.

10. The computer program product of claim 7, wherein the program instructions to calculate the location in the storage pool comprises program instructions to perform a mod operation on a numeric value to find in the storage pool a location of a database comprising the requested data, and wherein the database comprises the table.

11. A computer system for tracking data in a distributed system, the computer system comprising:
one or more processors, one or more computer-readable memories, one or more computer-readable storage devices, and program instructions stored on the one or more storage devices for execution by the one or more processors via the one or more memories, wherein the program instructions comprise:
program instructions to receive a request from a user for data of a type of data gathered over a specified period of time, the request specifying the type of data and the period of time;
program instructions to identify a software object specific to the specified type of data and the specified period of time, wherein the software object includes first data, and wherein the first data comprises a label that identifies the type of data, a group identifier that identifies a group of software objects that include the identified software object, and time data that identifies the period of time;
program instructions to calculate, by the software object based on the received first data, a location in a storage pool, wherein to calculate the location in the storage pool comprises to calculate a name of a table at the location in the storage pool, wherein the table includes the requested data, and wherein to calculate the name of the table comprises to concatenate the label, the group identifier, and the time data;
program instructions to connect, by the software object to the storage pool, to retrieve the requested data from the calculated location in the storage pool; and
program instructions to return, by the software object to the user, the retrieved requested data, wherein the calculating the location in the storage pool comprises calculating a name of a table at the location in the storage pool.

12. The computer system of claim 11, wherein the program instructions to identify the software object comprises program instructions to match the type of data and the specified period of time specified by the user to data in the software object identifying the type of data and the period of time to which the software object is specific, respectively.

13. The computer system of claim 11, wherein the storage pool is a relational database comprising tables and data, and wherein the method further comprises:
program instructions to denormalize the data in the storage pool to prevent joins between the tables in the storage pool.

14. The computer system of claim 11, wherein the program instructions to calculate the location in the storage pool comprises program instructions to perform a mod operation on a numeric value to find in the storage pool a location of a database comprising the requested data, and wherein the database comprises the table.

* * * * *